United States Patent [19]
Guthrie et al.

[11] Patent Number: 5,289,372
[45] Date of Patent: Feb. 22, 1994

[54] GLOBAL EQUIPMENT TRACKING SYSTEM

[75] Inventors: Jon E. Guthrie, Houston; Francis M. Marble, Dickinson; Clyde D. Ridgeway, Baytown, all of Tex.

[73] Assignee: Loral Aerospace Corp., New York, N.Y.

[21] Appl. No.: 931,771

[22] Filed: Aug. 18, 1992

[51] Int. Cl.$^5$ .................. G06F 15/00; G06F 7/04
[52] U.S. Cl. .................. 364/403; 364/408; 340/825.35
[58] Field of Search .............. 364/403, 405, 138, 408; 340/825.35, 825.49, 825.06, 825.07, 825.08, 825.15

[56] References Cited

U.S. PATENT DOCUMENTS

| | | | |
|---|---|---|---|
| 3,766,540 | 10/1973 | Schopfer et al. | 340/280 |
| 4,141,078 | 2/1979 | Bridges, Jr. et al. | 364/900 |
| 4,636,950 | 1/1987 | Caswell | 364/403 |
| 4,835,699 | 5/1989 | Mallard | 364/470 |
| 4,862,355 | 8/1989 | Neumann et al. | 364/200 |
| 4,920,488 | 4/1990 | Filley | 364/403 |
| 5,038,320 | 8/1991 | Heath et al. | 364/900 |
| 5,095,417 | 3/1992 | Hagiwara et al. | 364/138 |

Primary Examiner—Roy N. Envall, Jr.
Assistant Examiner—Khai Tran
Attorney, Agent, or Firm—Kenneth W. Float; Anthony W. Karambelas

[57] ABSTRACT

An equipment tracking system that provides for configuration management control over a plurality of pieces of equipment. The system includes a plurality of sets of sensors, a plurality of collectors, each individually coupled to a selected set of sensors, a concentrator coupled to the plurality of collectors, and a computer having a database for storing sensor data is coupled to the concentrator by way of a communication link. Each sensor is attached to a piece of equipment, and each sensor has a unique ID code. Each collector is coupled to a selected set of sensors, and is adapted to read out the ID code of each of the sensors at selected times, and store the changes for those sensors that have changed since the prior reading. The concentrator communicates with the plurality of collectors and causes the collectors to transmit the changed information. The present invention provides a non-manpower intensive system for providing current and accurate configuration management of thousands of pieces of equipment in a geographically dispersed environment. The present invention provides an automated system that instantaneously detects both authorized and non-authorized changes to a physical hardware configuration of a geographically dispersed equipment environment. It automatically communicates configuration change information to a centralized database which correlates the changes. The system accounts for operational interrupts such as power and hardware failures, provides for information importing from external databases using property tag identifiers, and provides for report generation using the internal and external databases.

12 Claims, 8 Drawing Sheets

GLOBAL EQUIPMENT TRACKING SYSTEM

BACKGROUND OF THE INVENTION

The present invention relates to equipment tracking systems, and more particularly, to an equipment tracking system that provides current and accurate configuration management information regarding the physical status of computer-related equipment.

The assignee of the present invention currently has the responsibility for the hardware and software engineering, installations and maintenance of institutional personal computers and their peripheral equipment (including data communications equipment). This equipment is dispersed in many offices across many on-site and off-site facilities. Crucial to providing effective and efficient engineering, installation and maintenance services is the existence of current and accurate configuration information. Such information has not heretofore existed. What does exist are heavily man-power dependent processes that produce a mainframe database that provides stale, inaccurate and incomplete information. Some of the contributors to this yield includes multiple transcribing/data entry (each a point for introducing error), multiple process queues (located in paperwork or a data entry queue), and the reliance upon someone to accurately report the physical changes.

Previous attempts at improving configuration management, focused upon what can be done to the existing processes to make them better in terms of accuracy, timeliness, and cost effectiveness. Many "business-as-usual" efforts have resulted in many sub-optimizations of the existing configuration management system. Collectively, they have not measurably improved the configuration management (CM) system, because they have not modeled the configuration management maintenance process (chain of significant events) and evaluated existing tools capabilities relative to that process.

A model of the configuration management system is shown in the table below.

the equipment configuration. Data collection includes detecting the change, reporting the change, and updating the change into a configuration management database. For the purposes of the present invention, automation is defined as the automatic operation or control of a process, equipment, or a system. It is further defined as the techniques and equipment used to bring about automatic operation or control of a process or system. It has been found that simply migrating part or all of a given work function to an electronic data processing or computer environment does not constitute automation. Therefore, simply using electronic data processing hardware, software and databases does not constitute automation.

The purpose of using automation is to perform a process more efficiently and effectively than it could be accomplished manually. Where a process for achieving an aim already exists, the proper implementation of automation must yield measurable cost and/or time savings over the manual approach for that process and must not detract from the product's quality. The present invention achieves automation of an automated configuration management system by using electronic data processing as an in-line (integral) tool that contributes directly to the process.

U.S. Pat. No. 3,766,540 issued to Schopfer et al., for "Appliance Removal Alarm System for Motels" describes a system whose primary function is to detect disconnected devices. It lacks the ability for a relocated unit to report its new location. This system does not provide for history logging of disconnected/relocated equipment nor does it provide the capacity to query individual locations (rooms/areas) for the ID numbers of equipment located at that location.

U.S. Pat. No. 4,920,488 issued to Filley, for "Physical Inventory System" is a non-real time location system. This system requires that each tracked item be labeled with a bar code which is scanned at random intervals. This system's configuration data is valid only until the first piece of equipment is moved and is not valid again

| /------time------> | | | |
|---|---|---|---|
| Hardware Change --> | Report the Change --> | Update CM Database --> | Do for Next |
| Authorized | Manual by configuration sheets | Multiple responsible | |
| - By Service Request (SR) | Multiple handoffs | Information duplicated across multiple databases | |
| - By Maintenance Problem Request (MPR) | Reported out of time sequence | Found by accident (controlled/owned by others) | |
| Unauthorized | | Updating is an add-on function (not part of the change process) | |

With the existing system there is no way, other than by chance or a physical audit, to detect an unauthorized configuration change. Even if a change is detected, the configuration management system requires many functional and organizational hand-offs from the first step in the reporting process to the final step in the database update process. Each handoff involves manual transcription (chance for errors) of the source information. Procedurally, everyone is responsible; therefore no one is responsible. Everyone does their best, but no one can perform better than the system permits. Armed with this knowledge, it was determined that a system engineering approach must be taken to the entire system and philosophy of configuration management in a distributed environment.

Fundamental to effective configuration management is current and accurate data collection for all changes to until the next time the facility is scanned. This system does not provide for continuous scanning and recording of the configuration of the equipment, with no human intervention required.

U.S. Pat. No. 4,141,078 issued to Bridges, Jr. et al., for "Library Circulation Control System" uses similar techniques and is generally the same as the system of U.S. Pat. No. 4,920,488.

U.S. Pat. No. 5,038,320 issued to Health et al., for "Computer System with Automatic Initialization of Pluggable Option Cards" describes a system that is used to control and configure the internal interface boards in devices such as personal computers, workstations and minicomputers. It provides no method of tracking the individual ID numbers of peripheral devices such as printers modems, terminals or units not connected a local area network. This system does not provide for universal tracking of equipment without requiring connectivity of the unit to any networks. This system could be configured to limit operation if a particular peripheral device is attached to another system. This system does not provide for automated equipment tracking that is transparent to the user, allowing for free movement and reconfiguration of the hardware.

U.S. Pat. No. 4,862,355 issued to Neumann et al., for "System Permitting Peripheral Interchangeability During System Operation" describes a system that is used to buffer and distribute data between various types of CPU's and peripherals. It provides no configuration control, management capability, or monitoring. It also lacks remote sensing capability.

U.S. Pat. No. 4,636,950 issued to Caswell, for "Inventory Management System Using Transponders Associated with Specific Products" most closely resembles the present invention. The theory of operation and scan characteristics, however, are very different than those of the present invention. This prior art invention is designed to scan for a certain element ID or group of ID's. The operator sets the scanner to search for a series of ID's until an acknowledgement signal is received from an inventory item with a transceiver preprogrammed with the ID number.

This system requires that each transceiver be programmed with all current transceiver numbers. This system can tell what equipment is located in a room when that equipment was installed, but it cannot recognize and report the identity of equipment which the user relocates into another room. This system cannot be used to determine which CPU is attached to which monitor and printer. The invention described in this patent does not have this ability to determine immediately the detailed inventory of a particular workstation. The invention described in this patent does can only tell the operator what equipment is in an area. This invention is used to track "high-value products e.g. a motorcycle or the like . . ." which would imply that the unit cost may be rather high. It also uses RF transmission which is not suitable for Federal Government facilities, for example, where highly sensitive equipment can be operationally contaminated by stray signal transmissions and where secrecy considerations are required. This system also requires the modification of the manufacturing process of the equipment to be tracked and does not appear to be universally adaptable to all types of devices.

SUMMARY OF THE INVENTION

The present invention provides for an equipment tracking system that provides for configuration management control over a plurality of pieces of equipment. The system comprises a plurality of sets of sensors, a plurality of collectors, each individually coupled to selected sensors, a concentrator coupled to the plurality of collectors, and a computer having a database for storing sensor data is coupled to the concentrator by way of a communication link. Each sensor is attached to a piece of equipment, and each sensor has a unique ID number or code. Each collector is coupled to a selected set of sensors, and is adapted to read out the ID code of each of the sensors at selected intervals, or continuously, and store the changes for those sensors that have changed since the prior reading. The concentrator communicates with the plurality of collectors and causes the collectors to transmit the changed information.

More specifically, each of the sensors comprise a plurality of shift registers respectively coupled through a plurality of resistors coupled to ground, and wherein the electrical paths are selectively opened and closed to provide the ID code of the sensor, and a communication interface coupled to the plurality of shift registers for receiving selected signals from the collector that cause the sensor to read out the ID code, and for transmitting the ID code to the collector.

The collectors comprise a communication interface coupled to the communication interfaces of the sensors for transmitting the signals to the sensor that cause it to read out its ID code and for receiving the transmitted ID codes, a storage memory coupled to the communication interface means for storing the ID codes received from each of the sensors, and a program memory coupled to the storage memory means for reading out the ID codes therefrom. A microprocessor is coupled to the storage memory and the program memory for causing the transmission of the signals to the sensors that cause them to read out their ID codes, and for storing the ID codes in the storage memory. A transceiver is coupled to the microprocessor for transmitting sensor changes to the concentrator under control of the microprocessor.

The concentrator comprises a transceiver that is coupled to the transceiver of each collector, for causing each collector to transmit the sensor changes, a storage memory coupled to the communication interface for storing the sensor changes received from each of the collectors, and a program memory coupled to the storage memory for reading out the sensor changes therefrom. A microprocessor is coupled to the storage memory and the program memory for causing the collectors to transmit the sensor changes, and for storing the sensor changes in the storage memory. A universal asynchronous receiver/transmitter is coupled to the microprocessor for transmitting sensor changes to the host under control of the microprocessor.

The present invention provides a non-manpower intensive system for providing current and accurate configuration management of thousands of pieces of equipment in a geographically dispersed environment. The present invention provides an automated system that instantaneously detects both authorized and non-authorized changes to a physical hardware configuration of a geographically dispersed equipment environment. It automatically communicates configuration change information to a centralized database which correlates the changes. The system accounts for operational interrupts such as power and hardware failures, provides for information importing from external databases using property tag identifiers, and provides for report generation using the internal and external databases.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 6 illustrates a flow diagram for a software program that operates in the collector of FIG. 4a.

DETAILED DESCRIPTION OF THE INVENTION

Figure 1:
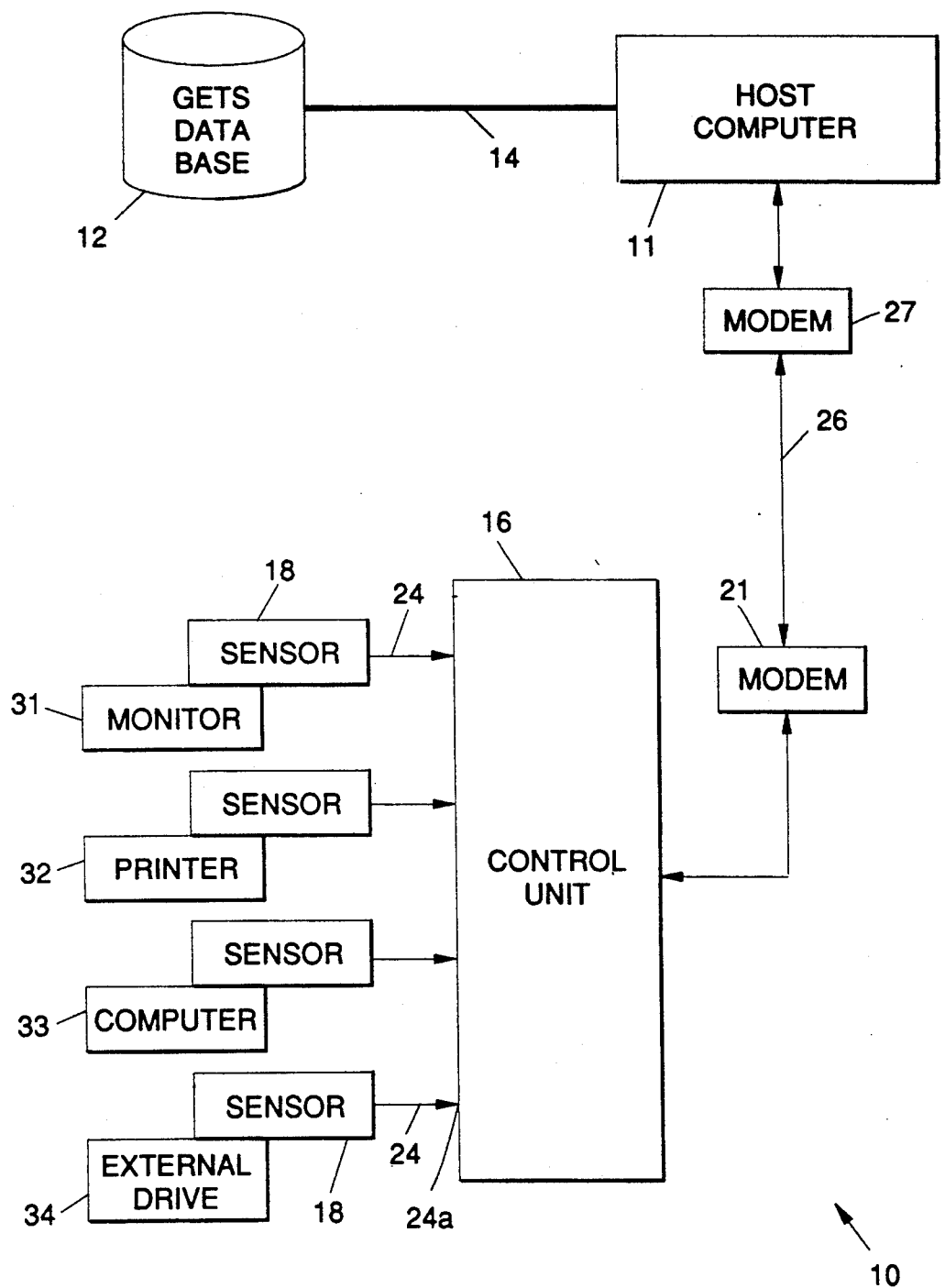
FIG. 1 illustrates a global equipment tracking system in accordance with the principles of the present invention.

Referring to the drawing figures, FIG. 1 illustrates a global equipment tracking system (GETS) 10 in accordance with the principles of the present invention. The global equipment tracking system 10 is comprised of a host computer 11 and a GETS database 12. The host computer 11 may be an IBM compatible computer, for example running a conventional DOS operating system. The host computer 11 and the GETS database 12 may be linked together by way of a local area network (LAN) 14. The global equipment tracking system 10 also comprises a control unit 16 that is coupled to the host computer 11, which has its own host computer modem 27, by way of a modem 21 and a communication channel or link 26, such as a telephone line, for example. The control unit 16 is coupled to a plurality of sensors 18 that are in turn attached to various pieces of equipment that the system 10 is adapted to monitor. The sensors 18 are connected to the control unit 16 by way of separate data cables 24. The equipment to which the sensors 18 are connected may include monitors 31, printers 32, computers 33, and external hard drives 34, for example.

Figure 2:
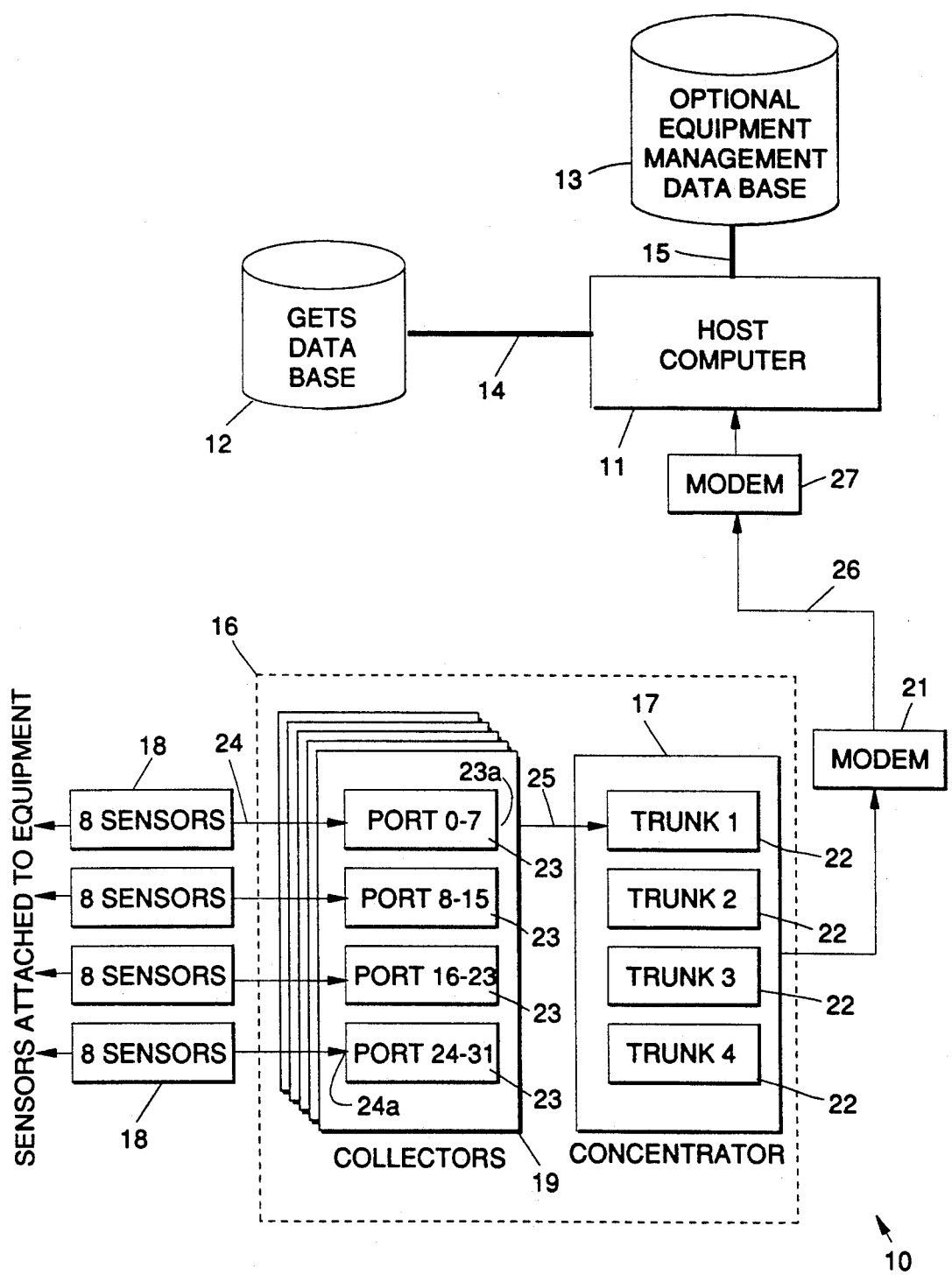
FIG. 2 illustrates a more detailed diagram of the global equipment tracking system of FIG. 1.

With reference to FIG. 2, it shows a more detailed diagram of the global equipment tracking system 10 of FIG. 1, and shows the details of the control unit 16 and an external equipment management system database 13 that may be coupled to the present system 10 by way of a second local area network 15 or that may operate stand-alone. One specific objective of the present invention is to access the equipment management system database 13 at regular intervals.

The control unit 16 is comprised of a concentrator 17 that includes four trunks 22 and 208 collectors 19 that each include four groups 23 (52 collectors 19 per trunk 22). Each of the four groups 23 of collectors 19 may be coupled to up to 8 sensors 18. Thus each collector 19 has up to 32 sensors 18 connected thereto. Each of the sensors 18 are adapted to transfer data by way of a particular port 23a of its respective collector 19 and pass the data along a data cable 25 to the trunk 22 of the concentrator 17 coupled thereto. Each of the trunks 22 of the concentrator 17 is coupled to the modem and the concentrator 17 is adapted to pass sensor data to the host computer 11 by way of the modem 21. Thus, the global equipment tracking system 10 can service up to 6656 sensors 18 and corresponding pieces of equipment 31, 32, 33, 34 per concentrator 17 and up to 256 concentrators 17 per communication link 26.

Figure 3:
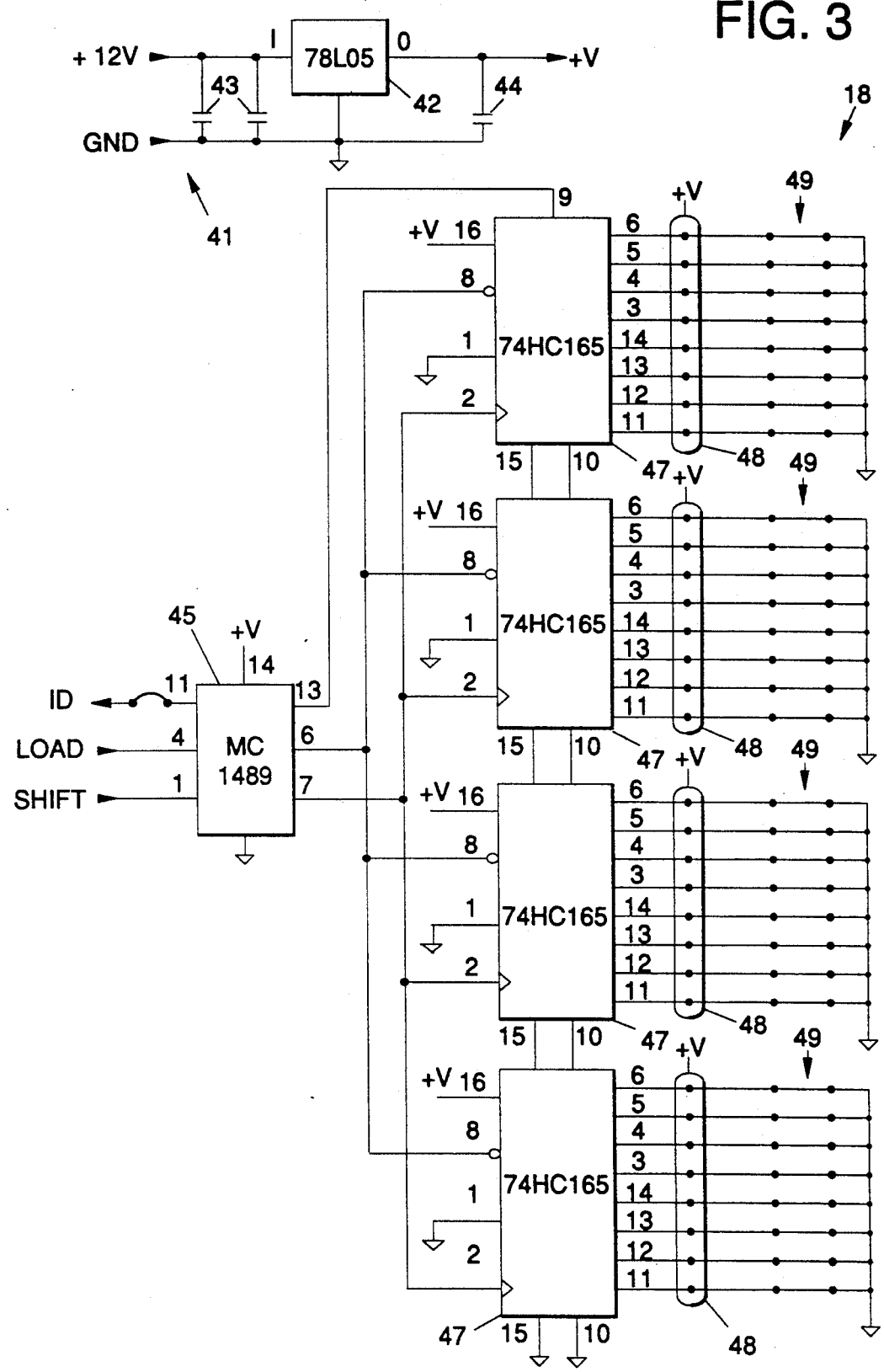
FIG. 3 illustrates a detailed drawing of a sensor employed in the global equipment tracking system shown in FIGS. 1 and 2.
Figure 4A:
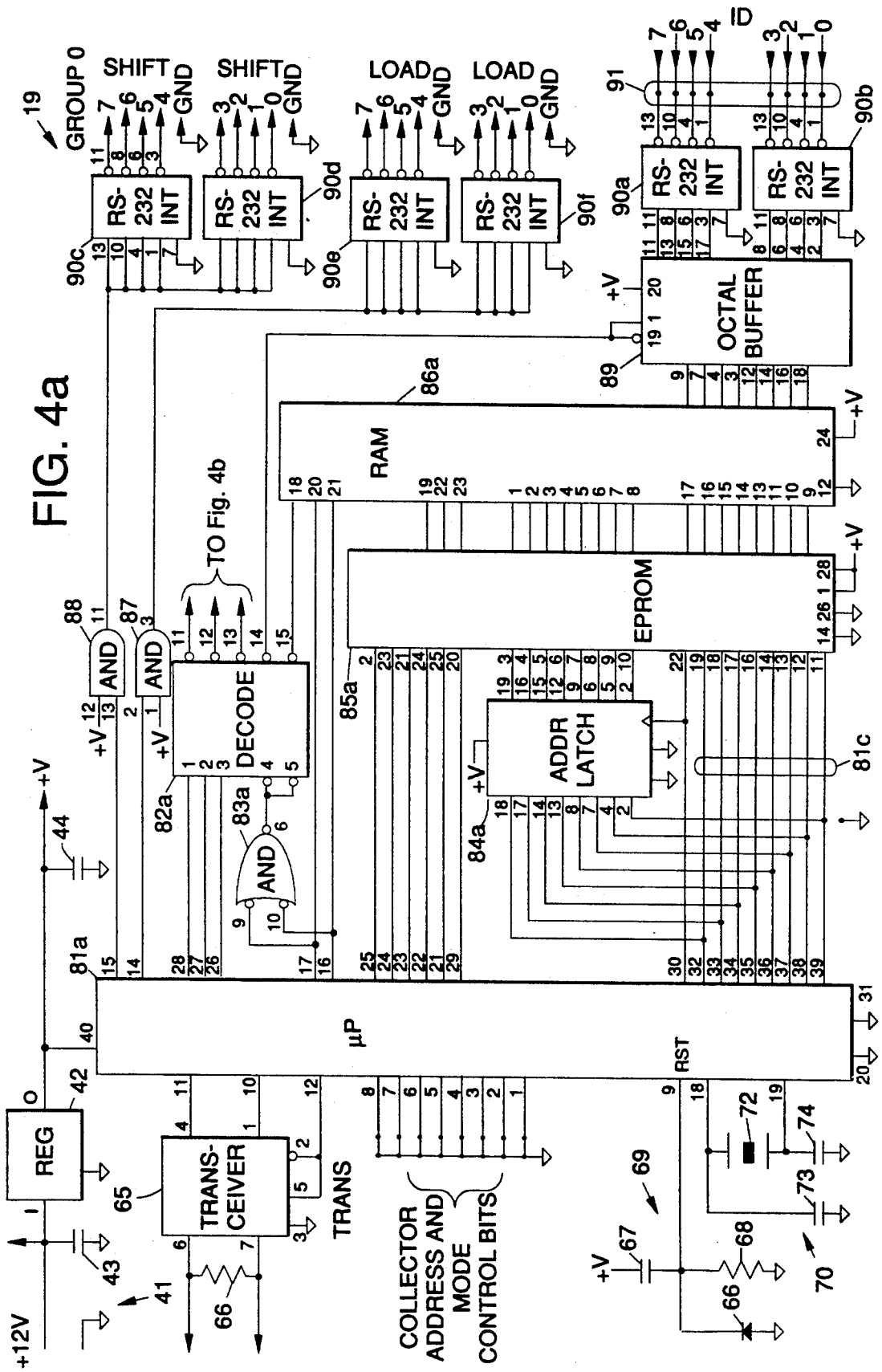
FIG. 4a illustrates a detailed drawing of a collector employed in the global equipment tracking system with 8 sensors shown in FIGS. 1 and 2.
Figure 4B:
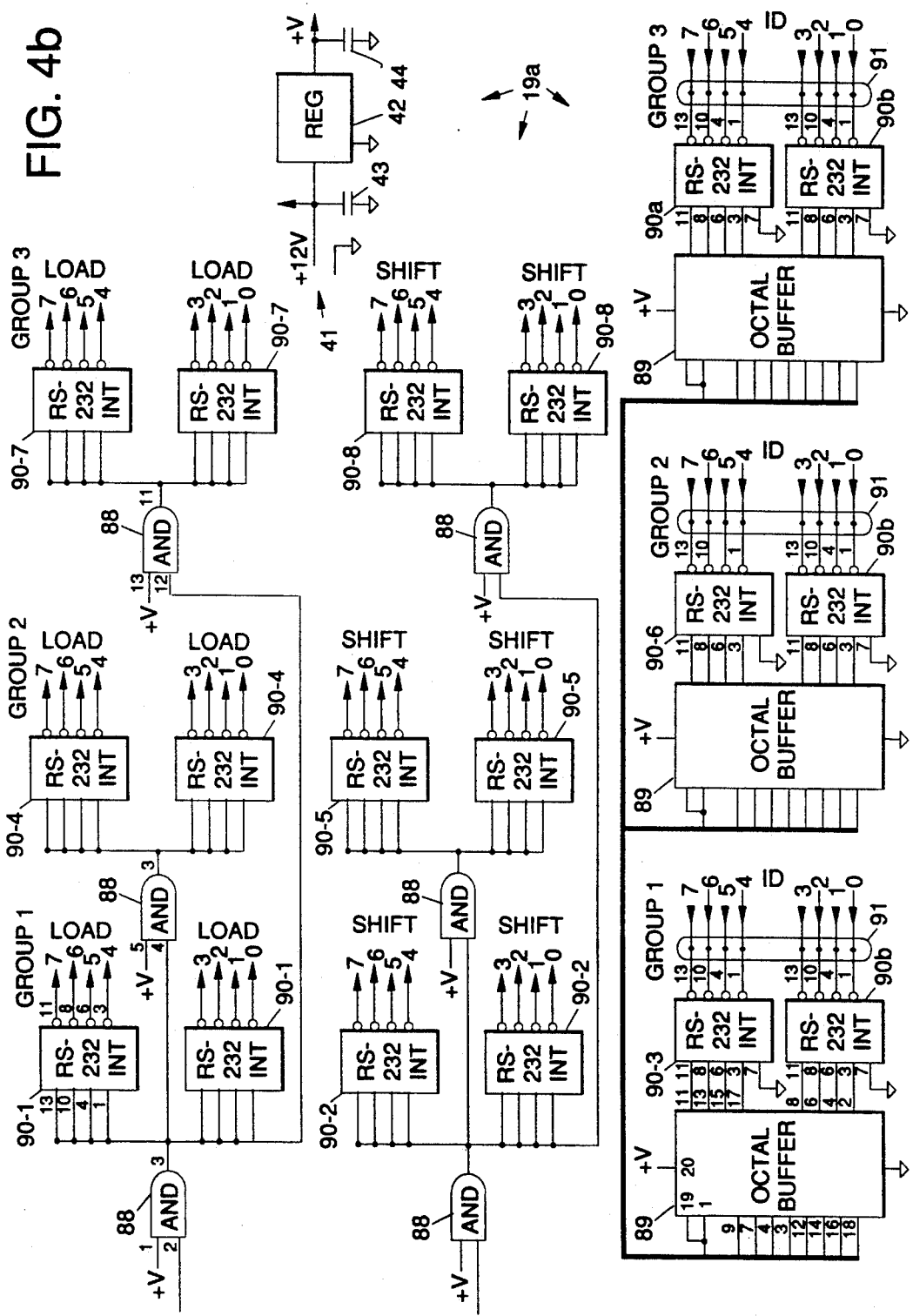
FIG. 4b illustrates a detailed drawing of a simplified collector for use with a single set of 24 additional sensors employed in the global equipment tracking system shown in FIGS. 1 and 2.
Figure 5:
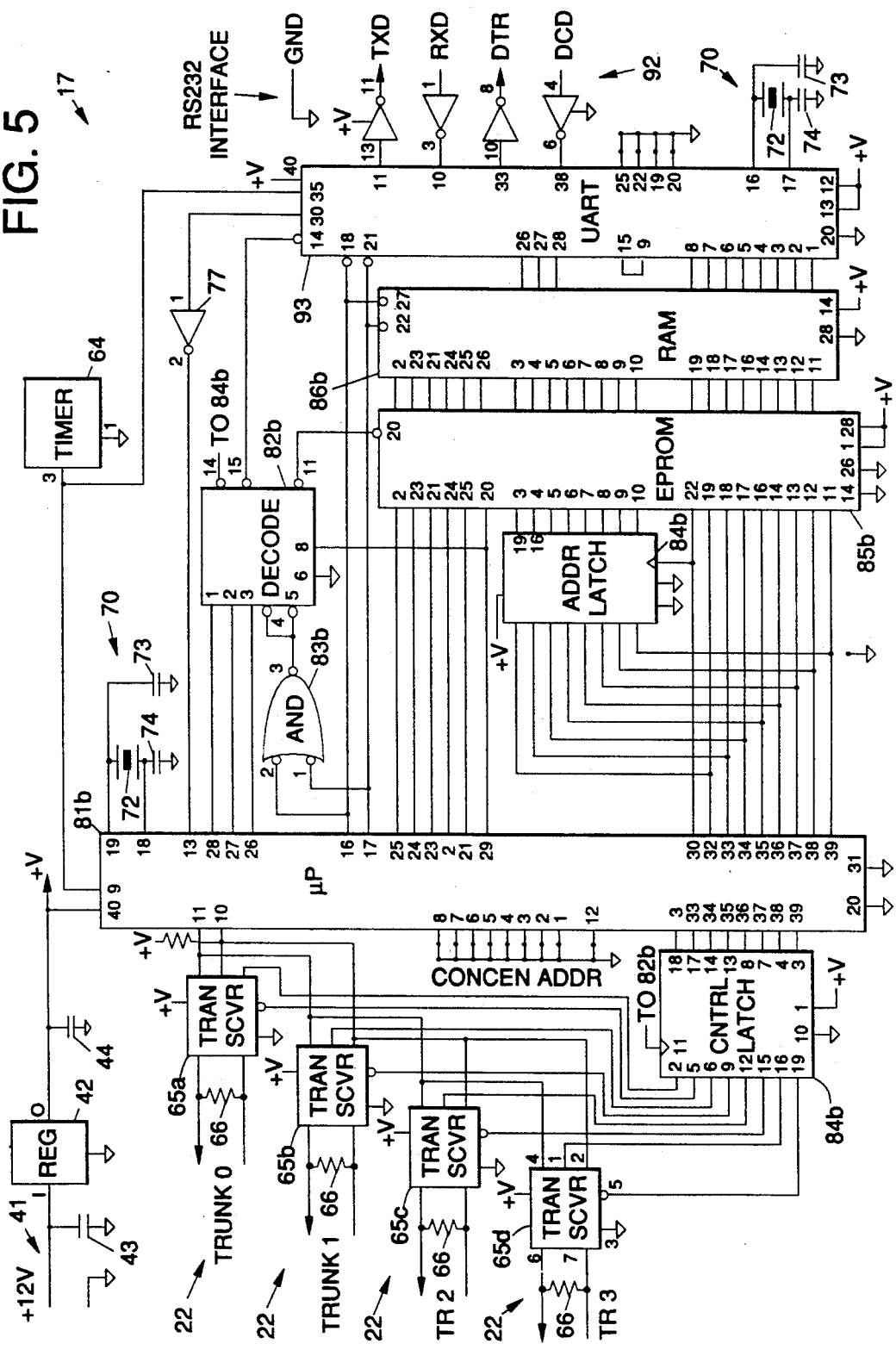
FIG. 5 illustrates a detailed drawing of a concentrator employed in the global equipment tracking system shown in FIGS. 1 and 2.

The details of construction of the sensors 18, collectors 19 and concentrator 17 shall be discussed with regard to FIGS. 3-5. FIG. 3 illustrates a detailed drawing of a sensor 18 employed in the global equipment tracking system 10 shown in FIGS. 1 and 2. The sensor 18 is coupled to a +12 volt power source 41 whose output voltage is regulated and converted to a 5 volt signal by means of a power regulator 42, such as a model 7805 power regulator, manufactured by Motorola, for example, and a plurality of filter capacitors 43. The output (+V) of the power regulator 42 is filtered by way of a capacitor 44 and is applied to four parallel-load eight bit shift registers 47. The shift registers 47 may each comprise a model 74HC165 parallel-load eight bit shift registers, manufactured by Texas Instruments, for example. In addition, an RS-232 interface 45 is employed to couple load and shift signals from the collector 19 that are adapted to load sensor data and shift the loaded sensor data out of each sensor 18 by way of the RS-232 interface 45 and a "shift out" (ID) line. Each of the shift registers 47 are coupled together in a conventional manner that permits the proper shifting of data. Each input of each of the shift registers 47 is connected to a pull-up resistor 48 and then to a grounded jumper 49. Cutting the jumpers 49 allow the inputs of the shift registers 47 to be pulled to a "1" (high); uncut inputs of the shift registers 47 remain at "0" (low).

FIG. 4a illustrates a detailed drawing of a collector 19 employed in the global equipment tracking system 10 shown in FIGS. 1 and 2. The collector 19 is coupled to the +12 volt power source 41 whose output voltage is conditioned by means of the power regulator 42 with appropriate filter capacitors 43, 44. The output (+V) of the power regulator 42 is a 5 volt output signal that is coupled to a microprocessor 81a, such as a model 80C32 microprocessor, manufactured by Intel, for example. A differential bus transceiver 65, such as a model 75ALS1-76A transceiver, manufactured by Texas Instruments, for example is coupled to the microprocessor 81a. A power off reset circuit 69 comprising a capacitor 67, a resistor 68, and a diode 66 are coupled to the 5 volt source and a reset input (RST) of the microprocessor 81a. An oscillator circuit 70 comprising a crystal oscillator 72, such as an 11.059 MHz oscillator, for example manufactured by NDK or CTS, for example, is capacitively coupled by two capacitors 73, 74 between ground and the microprocessor 81a.

The microprocessor 81a is also coupled to a variety of circuits including two AND gates 88, 87, such as model 74HC08 AND gates, manufactured by Texas Instruments, for example, a decoder 82a, such as a model 74HC138 3 to 8 line decoder manufactured by Texas Instruments, for example, an AND gate 83a coupled between the microprocessor 81a and the decoder 82a, an EPROM 85a, such as a model 27C128 EPROM, manufactured by Advanced Micro Devices, for example, a CMOS static RAM 86a having battery back-up, such as a model MK48Z02-20 static RAM, manufactured by Mostek, for example, and an address latch 84a, such as a model 74HC373 address latch, manufactured by Texas Instruments, for example that interfaces the EPROM 85a to the microprocessor 81a.

Input signals (ID) that control a shifting operation are applied to two RS-232 interfaces 90a, 90b, such as model MC1489 RS-232 interfaces, manufactured by Motorola, for example, that couple ID signals received from the RS-232 interface 45 in each of the sensors 18 through an octal buffer 89, such as model SN74HC244N octal buffer, manufactured by Texas Instruments, for example, to the microprocessor data bus 81c. Outputs of the respective AND gates 88, 87 are coupled to a plurality of RS-232 interfaces 90c, 90d, 90e, 90f, such as model MC1489N RS-232 interfaces, manufactured by Motorola, for example. The RS-232 interfaces 90c, 90d, 90e, 90f are respectively coupled to the RS-232 interfaces 45 in each of the sensors 18 that are coupled to the collector 19.

FIG. 4b illustrates a detailed drawing of a collector 19a for use with a set of 25 additional sensors 18 employed in the global equipment tracking system 10 shown in FIGS. 1 and 2. The voltage source 41 is provided as has been described above. Eight pairs RS-232 interfaces 90-1, 90-2, 90-4, 90-5, 90-7, 90-8 are coupled to respective AND gates 88 and provide shift and load signals in response to the respective sensors 18 coupled thereto. Eight sets of receivers comprising two RS-232 interfaces 90a, 90b and octal buffers 89 are provided that process data shifted out of each of the sensors 18 by way of the RS-232 interface 45 and ID signal lines.

FIG. 5 illustrates a detailed drawing of a concentrator 17 employed in the global equipment tracking system 10 shown in FIGS. 1 and 2. The concentrator 17 is coupled to a +12 volt power source 41 whose 5 volt output voltage is conditioned by means of a power regulator 42 and capacitors 43, 44. The output (+V) of the power regulator 42 is coupled to a microprocessor 81b and other components as indicated by the +V voltage identifier. An oscillator circuit 70 comprising a 11.059 MHz crystal oscillator 72 and two capacitors 73, 74 is coupled between ground and the microprocessor 81b. Four transceivers 65a, 65b, 65c, 65d are coupled to the microprocessor 81b that are respectively responsible for communicating with the four trunks 22 of each of the collectors 19.

The microprocessor 81b is also coupled to a plurality of circuits including an EPROM 85b, an address latch 84b that interfaces the microprocessor 81b to the EPROM 85b, a static RAM 86b having battery back-up coupled to the EPROM 85b. An AND gate 83b is coupled between selected pins of the microprocessor 81b and a decoder 82b as indicated. The above circuitry is substantially the same as the circuitry for the collector 19 described with reference to FIG. 4a above. A control latch 84b is coupled between the microprocessor 81b and each of the transceivers 65. A universal asynchronous receiver/transmitter (UART) 93 is coupled to the microprocessor 81b and the RAM 86b. A timer 64 is provided and is coupled to the microprocessor 81b and the UART 93 to provide power on reset. An RS-232 communication link 92 is coupled to the UART 93, and is coupled to the host computer 11 by way of the modems 21, 27.

In operation, the global equipment tracking system 10 works as follows. Each sensor 18 is physically attached to a piece of equipment 31-34 and stays with the equipment 3114 34 throughout its operating life. The sensors 18 connect to the collector 19 by way of a conventional 6-conductor telephone cable 24 using RJ11 connectors 24a, for example. Encoded into each sensor 18 is a 32 bit number where the 6 high order bits are zero, and the 26 low order bits of this number make up its GETS ID number. The sensor 18 has one of 67,108,864 different ID numbers. Therefore, a maximum of 67,108,864 different pieces of equipment 31-34 can be tracked by the present system 10. The GETS ID number is permanently encoded in each sensor 18 using the jumpers 49 and pull-up resistors 48. A load pulse applied to the RS-232 interface 45 in the sensor 18 from the collector 19 causes the sensor 18 to transmit its 26 bit GETS ID number.

Collectors 19 are located in each room of a multi-room building, for example, and every sensor 18 in a room connects to this collector 19. There are two models of the collector 19, 19a; one collector 19a (FIG. 4b) has a single channel that supports up to eight sensors 18; the other collector 19 has four channels and supports up to thirty-two sensors 18. A four group collector 19 (FIGS. 4a and 4b) supports from one to four separate rooms with eight sensors 18 on each group.

Figure 6:
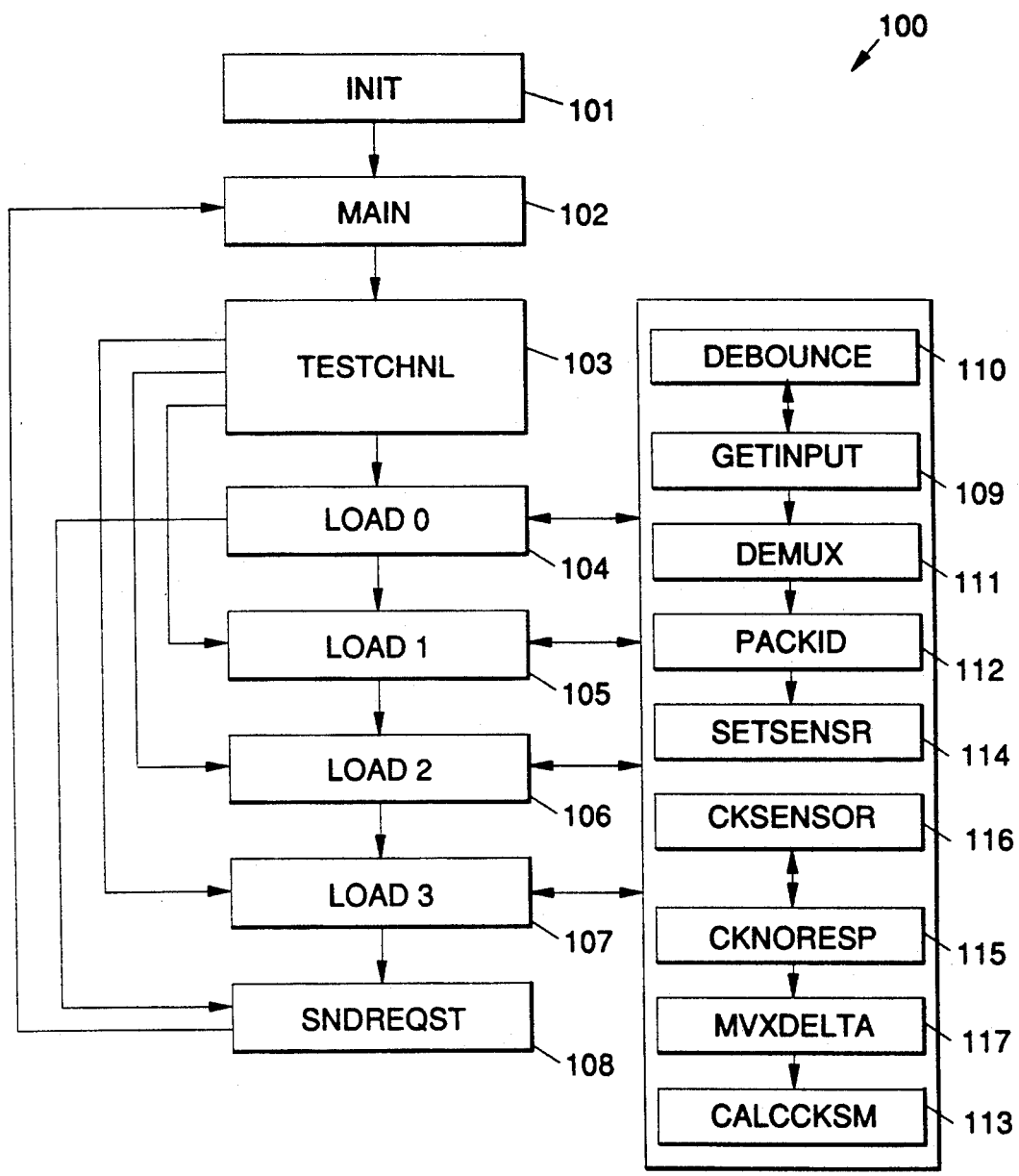
Figure 7:
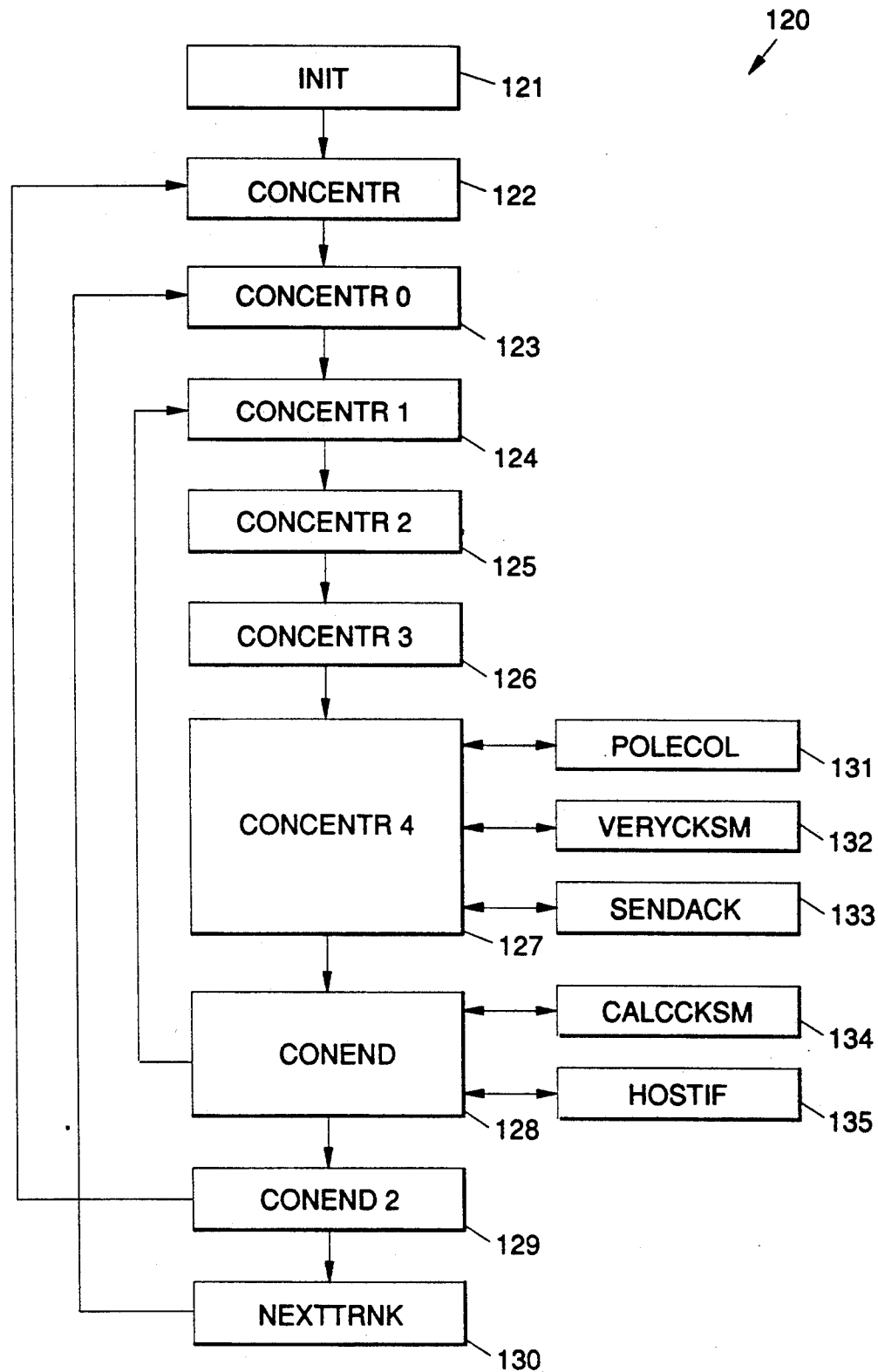
FIG. 7 illustrates a flow diagram for a software program that operates in the concentrator of FIG. 5.

Code for the collector 19 resides in the EPROM 85a. A procedural language description of the relevant software for the present system is provided in the Appendix attached hereto. In addition, FIGS. 6 and 7 show flow diagrams of the processing that takes place in each of the collectors 19 and the concentrator 17 of the present system 10. All of the major functions of the collector 19 are performed by its microprocessor 81a, including collecting and transmitting data. All of the bits in the GETS ID number are read directly into the microprocessor 81a, one bit at a time.

The collector 19 polls all of the eight possible sensors 18 attached thereto. Either the GETS ID or zeros is stored in the RAM 86a location that corresponds to the sensor's logical address. The following determinations are made by the collector 19: (a) that a sensor 18 has been connected and the GETS ID is sent; or (b) that a sensor 18 has been disconnected and the GETS ID has been replaced with all zeroes; or (c) no changes have been made and a "good health" message code is sent. Only a change in status and the changed information is sent to the concentrator 17, except on initial power up when all sensor data is transmitted. An RS-422/485 interface 65 connects the collectors 19 to the concentrator 17. The collectors 19 and concentrators 17 transmit in half duplex mode, and require only two wires for communication. Transmission of data between the collectors 19 and concentrators 17 is at 9,600 bits per second.

There is at least one concentrator 17 for each building, for example, and all of the collectors 19 in the building attach to this concentrator 17. Up to 52 collectors 19 may be attached to one concentrator 17 on each of the four concentrator trunks 22. This allows a maximum of 208 collectors 19 for each concentrator 17, and if fully loaded, a total of 6,656 sensors 18 coupled to a concentrator 17. The code for the concentrator 17 resides in the EPROM 85b. The microprocessor 81b performs all of the major functions of the concentrator 17.

The concentrator 17 retrieves and stores all of the changes from each of the collectors 19, one trunk 22 at a time. If changes exist, it then calls up the host computer 11, through the modem 21 and transmits the data to the host computer 11. After the concentrator 17 has sent all of its data, it sends a "no more data" status code to the host computer 11 and hangs up. The host computer 11 only receives collector 19 changes from the concentrator 17, except on power up, thereby minimizing data transmitting and processing by the host computer 11.

When initially installed, the concentrator 17 collects the initial configuration of all of the collectors 19 connected to it and then waits for the host computer 11 to call and transmit the phone number of the host computer modem 27. After the phone number is sent, the concentrator 17 stores the phone number in its battery backup RAM 86b. As long as the phone number is in the RAM 86b, the concentrator 17 will not wait for the phone number again.

The host computer 11 collects the data from each concentrator 17 coupled thereto and stores the information in the GETS database 12. One host computer 11 can handle up to 256 concentrators 17, which allows a host computer 11 to handle 1,703,936 sensors 18. An IBM compatible personal computer (PC), running a DOS operating system, may be used as the host computer 11. The PC has at least 640K bytes of memory, 120 MB hard drive, and has at least one serial port, by which it uses to communicate with the modem 21. On power up the host computer 11 calls every concentrator 17 registered in the GETS database 12. After the host computer 11 is running, it calls each concentrator 17 once every 24 hours. Any other time the host computer 11 waits for each concentrator 17 to call.

The sensor 18 employs four parallel-load eight bit shift registers 47, and the eight parallel inputs of each of the shift registers 47 are tied to ground through the pull-up register 48. This ground causes a zero voltage to exist at each input pin of the shift registers 47, and therefore each such shift register 47 loads a zero. Cutting the ground on an input pin of the shift register 47 causes a positive voltage at that pin. This positive voltage represents a binary one to the shift register 47 when loaded. To enter the GETS ID number, the GETS ID number is translated into a 26 bit binary number, wherein the binary number corresponds to the 26 low order bits of the shift registers 47, and the ground is cut where there is a binary one.

The microprocessor 81a in the collector 19 sends out a load pulse on the six-wire telephone cable 24 to the sensor 18, which loads the GETS ID number into the shift registers 47. The ID line (by way of the RS-232 interface 45) has the most significant bit at the time of the load pulse. Then the collector 19 sends out 31 shift pulses to shift the GETS ID number out over the telephone cable 24 and into the microprocessor 81a. Since the GETS ID number contains 26 bits, the most significant six bits are zero.

One collector 19 is located in each room of the building, and all of the sensors 18 for each piece of equipment 31-34 connect to that collector 19. Each sensor ID number is read into the RAM 86a of the collector 19 and a determination is made as to what sensor ID numbers have changed. These changes are then collected and transmitted to the concentrator 17. The collector 19 employs the microprocessor 81a to provide its intelligence. Most of the components used in the design of the collector 19 are used to either interface the microprocessor 81a to RAM 86a or to communicate with the sensors 18 and concentrator 17. Sensor ID numbers are read in through quadruple line receivers that comprise the RS-232 interface. Each sensor 18 has its ID, load, and shift lines tied to six separate line receivers comprising the RS-232 interfaces 90a and 90b, 90c and 90d, and 90e and 90f. When the collector 19 reads the sensors 18, one bit from each sensor 18 connected to the collector 19 is seen at the same time. After 31 shift pulses are sent out to the sensors 18, all of the sensors 18 have their ID numbers in the RAM 86a. This enables the collector 19 to read up to eight sensors 18 in parallel, and insure that no changes in sensors 18 are missed. In the event that the optional 32 sensor model (FIGS. 4a and 4b) is used, eight GETS ID numbers are loaded across each of the four groups 23.

The ID lines of each sensor 18 are coupled through the RS-232 interfaces 90a, 90b to the octal buffers 89. Eight bits of data is read from the octal buffers 89 in parallel. These eight bits are comprised of one bit from each of the eight possible sensors 18. Since all of the ID lines coupled through the RS-232 interfaces 90a, 90b have pull up resistors 91, any sensor 18 that is not present will allow the line to go high, which when inverted by the RS-232 interface 90a, 90b forces a zero bit read in for each read cycle. After the microprocessor 81a reads the octal buffers 89, it then requests the next bit from each sensor 18.

Once the microprocessor 81a reads in all 26 bits of each sensor ID number, it compares all of the just read ID numbers to the numbers that were read previously. Any differences are collected and sent to the concentrator 17 for transmission to the host computer 11. The differences are sent to the concentrator 17 through the differential bus transceiver 65. The differential bus transceiver 65 conforms to the EIA RS-422/485 standard. Before any data is sent to the collector 19, the microprocessor 81a waits for the concentrator 17 to request the data.

Two different memory chips are used in the collector 19. The EPROM 85a contains the program for the microprocessor 81a, and the CMOS static RAM 86a is used as a buffer, and temporary storage. The CMOS static RAM 86a has battery back-up, so that none of the stored data is lost in case of a power failure.

The concentrator 17 is responsible for gathering all of the changes from the collectors 19 and transmitting the changes to the host computer 11. Every collector 19 is polled to see if it has any changes to transmit, and to make sure the collector 19 is operational. Once polled the collector 19 responds with either a "good health" message or the changes. After all collectors 19 are polled, if any collectors 19 have changes, those changes are transmitted to the host computer 11.

The design of the concentrator 17 is very similar to that of the collector 19, except for the addition of the UART 93 and the elimination of the octal buffers 89 and RS-232 interface 90a, 90e. There are also three additional differential bus transceivers 65 in the concentrator 17. These additional differential bus transceivers 65 allow the concentrator 17 to communicate with a maximum of 208 collectors 19. Each RS-422/485 interface comprising the differential bus transceivers 65 can communicate with 52 collectors 19, on each trunk 22. There are a total of four trunks 22 for on each concentrator 17. After one trunk 22 has been polled, the concentrator 17 ascertains whether any data needs to transmitted to the host computer 11. Then the next trunk 22 is polled and data transmitted if necessary. This process of trunk polling continues until the microprocessor 81b has processed all trunks 22.

The universal asynchronous receiver/transmitter (UART) 93 is used by the concentrator 17 to communicate with the host computer 11 through the modem 21. Interrupts to the microprocessor 81b are generated every time a data byte is sent or received. This allows the microprocessor 81b the time needed to poll the collectors 19, since the UART 93 interrupts the microprocessor 81b when an event occurs. One quadruple line receiver in the RS-232 communication link 92 is used to drive each of the following RS-232-C signals: transmit data (TXD); receive data (RXD); data terminal ready (DTR); and data carrier detect (DCD). The data terminal ready (DTR) is a signal that comes from the concentrator 17, and is used by the modem 21 to tell if the concentrator 17 is working. Data carrier detect is generated by the modem 21, and is used by the concentrator 17 to tell if the communication link to the host computer 11 is still asserted.

FIG. 6 illustrates a flow diagram for a software program 100 that operates in the collector 19 of FIG. 4a. The collector software program 100 comprises the following steps. An initialization step (INIT) 101 initializes sensor control lines, clears external RAM if a battery backup flag is not set, clears its internal RAM and initializes an internal UART located within the microprocessor 81a. A MAIN step 102 initializes all pass dependent variables. A TESTCHANL step 103 determines which of the four groups of eight sensors 18 are currently operational.

A LOAD0 step 104 generates shift pulses and calls the appropriate routines to debounce, logically address, demux, pack the first 8 sensors 18, and verifies the current sensor ID number against the previous pass. If changes are found, a routine is called to save the changes. A test is performed to determine if other groups of 8 sensors 18 are in use, and if so, it continues to LOAD1 step 105. The LOAD1 step 105 generates shift pulses and calls the appropriate routines to debounce, address, demux, pack the next 8 sensors 18, and verifies the current sensor ID number against the previous pass. If a change is found, a routine is called to save the changes. A LOAD2 step 106 generates shift pulses and calls the appropriate routines to debounce, address, demux, pack the next 8 sensors 18, and verifies the current sensor ID number against the previous pass. If a change is found, a routine is called to save the changes. A LOAD3 step 107 generates shift pulses and calls the appropriate routines to debounce, address, demux, pack the next 8 sensors 18, and verifies the current sensor ID number against the previous pass. If a change is found, a routine is called to save the changes. If any changes are detected from any of the LOAD routines, a checksum is then calculated on the data accumulated in an XDELTA buffer which is a partition in the RAM 86a and SNDREQST routine 108 is called to send the changes to the concentrator 17.

A SETSENSR routine 114 appends the appropriate logical address for each sensor 18 depending upon which group of 8 sensors 18 is currently addressed in the input buffer, which is a partition in internal RAM. A CKNORESP routine 115 determines if all of the 26 valid data bits in the sensor ID number in the input buffer are zero. If all are zero, a "no response" flag bit is set. A CKSENSOR routine 116 checks each byte of the current sensor ID number in the input buffer against each byte of the sensor ID number in the primary buffer, which is a partition in the RAM 86a from the previous pass. If a change is detected, it is saved in the PRIMARY buffer, a partition in RAM 86a, and DELTA buffer, a partition in internal RAM. After all of the changes are saved in DELTA buffer for a given group of eight sensors, the changes are then moved to the XDELTA buffer in the RAM 86a by a MVXDELTA routine 117.

If a change is detected by either LOAD0 or LOAD3, then a jump is made to the SNDREQST routine 108 which waits for a request to send the changes in the XDELTA buffer to the concentrator 17. Once the changes are sent the routine then waits for the data to be accepted. A GETINPUT routine 109 and a DEBOUNCE routine 110 insure that the sensor ID lines are settled then takes in all 32 sensor ID numbers one bit at a time in the DEBOUNCE buffer, which is a partition in the internal RAM. A DEMUX routine 111 takes the debounced data and separates the incoming serial data ID numbers into groups of 8 bits in the DEMUX buffer, which is a partition in the internal RAM. A PACKID routine 112 packs the 8 demuxed bits into groups of 4 bytes each and places the packed data into the INPUT buffer. A CALCCKSM routine 113 calculates the checksum of all data in the XDELTA buffer using Fletcher's algorithm and places the 2 byte checksum at the end of the XDELTA buffer in the RAM 86a.

The LOAD0, LOAD1, LOAD2, and LOAD3 routines 104–107 each call the following routines. They each: call DEBOUNCE, DEBOUNCE calls GETINPUT, and GETINPUT returns to DEBOUNCE; call DEMUX and DEMUX returns to LOAD#; call PACKID and PACKID returns to LOAD#; call SETSENSR and SETSENSR returns to LOAD#; call CKSENSOR, CKSENSOR calls CKNORESP, and CKNORESP returns to CKSENSOR; call MVXDELTA and MVXDELTA returns to LOAD#; call CALCCKSM and CALCCKSM returns to LOAD#; and jump to SNDREQST if a change was detected and SNDREQST jump to MAIN when the routine is done, or jump to TESTCHNL and TESTCHNL jumps to LOAD0, LOAD1, LOAD2, and LOAD3 depending on the channel number (CHNLNUM).

FIG. 7 illustrates a flow diagram for a software program 120 that operates in the concentrator 17 of FIG. 5. The concentrator software program 120 comprises an INIT routine 121 sets up the internal UART (located in the microprocessor 81a) and the external UART 93, modem 21, internal pointers, clears internal and external RAM buffers and sets up pointers and control formats. A CONCENTR routine 122 initializes all pass dependent pointers and variables (all 4 trunks 22 if applicable).

A CONCNTR0 routine 123 initializes all trunk dependent pointers and variables. Also tests for incoming "Dump Command" and executes the appropriate routines. A CONCNTR1 routine 124 initializes pointers and variables used on each collector data request. Also tests for "Buffer Full" and if detected requests that data be sent to the host computer 11. CONCNTR2 and CONCNTR3 routines 125, 126 test for "Last Collector" of a trunk and sets "End Data Bit" if detected. A CONCNTR4 routine 127 calls a POLECOL routine 131 (to pole each collector on a trunk), calls a VERYCKSM routine 132 (that verifies checksum on the data sent by the collector 19), and calls a SENDACK routine 133 once the checksum verifies.

A CONEND routine 128 tests if the previous collector 19 was the last one on this trunk and if so tests if changes were detected on any of the previous collectors 19. A CALCCKSM routine 134 is called to calculate the checksum on the data accumulated and a HOSTIF routine 135 is called to send the data to the host computer 11. Once the data is sent to the host computer 11 a test is performed to see if there are multiple trunks 22. If there are multiple trunks 22, then the next trunk 22 is requested, if not "no more data to follow" is sent to the host computer 11. A CONEND2 routine 129 tests for multiple trunks 22 and continues to a NEXTTRNK routine 130. The NEXTTRNK routine 130 updates variables used for a specific trunk 22 and sets "end data" bit on the last trunk 22.

The POLECOL routine 131 requests each collector on a trunk 22 to respond with either any changes detected or "Good Health" status message. If a change is detected the data is saved. A software timer is started every time a collector 19 is called and should the time expire before the collector 19 responds, the collector 19 is flagged as "Nonresponsive" after 3 retries. The VERYCKSM routine 132 computes the checksum of the incoming data and verifies it against what was previously computed. If the results is correct a zero status is returned. The SENDACK routine 133 routine sends an "Acknowledge" to the appropriate collector 19. The CALCCKSM routine 134 calculates the checksum on the data to be sent to and from the host computer 11. The HOSTIF routine 135 handles all the modem controls and interprets incoming commands from the host computer 11, sends data to the host computer 11 and after initial power up requests the Phone Number of the modem 27 of the host computer 11.

GETS software also runs on the host computer 11 running under its operating system. It uses the GETS database 12 to store all of the data received from the concentrator 17. The global equipment tracking system 10 and GETS software operates as follows. As soon as a concentrator 17 has any changes to report to the host computer 11, it calls the host computer 11 by way of the modem 21 and the modem 27 of the host computer 11. The host computer 11 software logs all of the information sent to it from the concentrator 17 in the database 12. Each change event is automatically time stamped, with the date and time, before it is written to the database 12. The host computer 11 software then automatically updates the GETS database 12 with the information that is obtained from the concentrator 17.

The GETS database 12 is comprised of the following tables: sensor table; collector table; collector information table; concentrator table; and disconnected table. The global equipment tracking system 10 maintains the correct location and status of each piece of equipment 31-34 in these database tables.

Communication between the concentrator 17 and the host computer 11 is initiated by either the concentrator 17 or the host computer 11. The concentrator 17 initiates the call when it has a status change to send to the host computer 11. A series of acknowledgements (ACK), service request (SRQ), and checksums ensure the integrity of the data. After data is transmitted, an ACK message is sent to indicate that the data was received with out errors. If an ACK message is not received before a timeout occurs or an SRQ message is received, then the data is resent. The data is sent up to three time, if an ACK message is not received after three resends then communications is terminated.

In order to prevent a hardware failure at the concentrator 17 from causing stale information to be stored in the database 12, the host computer 11 calls all of the concentrators 17 at least once every 24 hours. Any concentrator 17 that does not respond to the call is flagged as a no response, and the location of the concentrator 17 is noted in the database 12. The information from the database 12 is used to dispatch maintenance personnel to check out the questionable concentrator 17. All of the equipment 31-34 attached to this concentrator 17 is updated with a concentrator 17 failure status, so that anyone requesting information on this equipment 31-34 will know that the data may not be correct. It is also during this time period that the concentrator 17 can request the host computer 11 phone number.

The sensor table contains all of the GETS ID numbers that is used by the global equipment tracking system 10. The GETS ID number is assigned to a piece of equipment 31-34 as soon as it is received, even if the equipment 31-34 is not to be used immediately. An optional equipment management tag is used to correlate each GETS ID number, so that the external equipment management database 13 can be accessed for that piece of equipment 31-34. The sensor table is manually maintained, since a GETS ID must be assigned and any optional fields associated with the GETS ID number, such as an equipment management tag.

The other four tables are automatically updated by the GETS software, except for building and room assignments. These four tables are used by the GETS software in order to keep track of where the equipment 31-34 is located, and the status of the equipment 31-34. The user of the global equipment tracking system 10 only provides collector and concentrator ID numbers, and their locations (building and room), to these tables.

The GETS database 12 contains five tables and at least one field in each of these tables, that link the tables together. A link to the optional external equipment management database 13, that is used to retrieve data for report writing, is maintained in one of the tables. The host computer software does not update the external database 13.

The main table is the sensor table, which can contain the links needed to access an optional external database 13. An example of this link is the equipment management tag number. Through these links, the GETS ID number is related to an equipment management database 13. Other optional fields can be defined in this table, such as an equipment description field, vendor field or any field that a user might want to define. These optional fields makes global equipment tracking system 10 very flexible. The only required field is the GETS ID number.

The collector table contains information about which sensors 18 are connected to the collector 19. The concentrator ID, concentrator trunk number, collector ID, and collector port number make up the key for this table. Each collector port has a specific location assigned to it, and this allows one collector 19 to keep track of eight to thirty-two locations and sensors. A blank or a zero GETS ID number indicates that a sensor 18 was never connected to the collector 19 or it was disconnected from the collector 19. Every sensor 18 has a GETS ID number assigned to it and this ID is stored in the collector table. The GETS ID number stored in this table, can then be used to access the GETS ID table, in order to retrieve more information.

Two of the tables, that are used by the GETS host software are used for keeping track of the GETS hardware. The concentrator data table contains the location, phone number, and status of each concentrator 17. Unlike the other tables, it does not have a direct link to any other table, since it is the root of the GETS database 12. The collector information table contains information about the collector, such as status and location. The last table is the disconnected data table and is used by the GETS software to keep track of which sensors 18 have been disconnected from the system 10. Information about sensor disconnects are maintained so that the move or reconnect status of the sensor 18 can be determined.

Only one concentrator 17 reports during any given transmission and only changes are transmitted, except on concentrator 17 or collector 19 power up. From 1 to 52 collectors 19 can report for each concentrator trunk 22. There are three different data formats that the host computer 11 uses to communicate with the concentrator 17. The first two are data acknowledgement (X'20') and service request (X'80'). Every time the concentrator 17 transmits data to the host computer 11, the host computer 11 must send a data acknowledgement (ACK). The data acknowledgement is necessary in order to inform the concentrator 17 that the data was received and it was correct. A service request (SRQ) command is used to request data to be transmitted or to request a retransmission of the last data sent.

The last data format is used by the host computer 11 to request that the host computer's phone number be sent to the concentrator 17. The first four most significant bits of this format contain a hex ('40'), and the last four least significant bits contain the length of the phone number being transmitted. This first byte of the data format is followed by the phone number in ASCII format.

Communication between the concentrator 17 and the host computer 11 is synchronized through the use of a stop-and-wait automatic request method (ARQ). Every piece of information that is transmitted has a checksum in the last two bytes of the data stream. There are three different ways that the communications work: the concentrator 17 initiates the call to the host computer 11; the host computer 11 calls the concentrator 17; or the host computer 11 calls the concentrator 17 after a power failure.

The stop-and-wait automatic request (ARQ) method of transmitting works by having one party transmit the data and stop-and-wait for an ACK. If, after some predetermined time, the party that transmitted the data does not receive an ACK, the data is retransmitted. If the party that transmitted receives a SRQ, it again retransmits the data. This method insures that the data is received by the receiving party. The host computer 11 and concentrator 17 only retransmits the data three times, and after the third time the transmitting party disconnects and flags a hardware error.

The GETS database 12 is used to log of all of the changes in the global equipment tracking system 10, and every entry has a date and time stamp. This data is stored in a log table, and is referred to as the activity log. The activity log has a record type field. This field is used to determine what type of record is in the activity log. The following is a list of all the possible record types: 1-GETS ID data; 2-collector address data; 3-concentrator address data.

The status field in the activity log is designed to facilitate several different logic statements. The first indicates whether or not the new GETS ID number or the GETS ID from the database 13 are non-zero. This is represented as 1 or 0 (true or false) in the table. The next test to be performed is whether or not the two GETS ID numbers are equal. This can be represented as a 1 or 0 (not zero or zero). A A check is made to see if the new GETS ID number is located in the disconnect database (yes-1 or no-0).

Thus there has been described a new and improved equipment tracking system that provides current and accurate configuration management information regarding the physical status of computer-related equipment connected to a network. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

APPENDIX SOFTWARE DESIGN LISTING PROGRAM DESCRIPTION LANGUAGE (PDL)

Presented below is a description of the host computer software design for use in the global equipment tracking system 10. Included is a description of what each software routine does, followed by its preliminary design language (PDL). The PDL may be used by those skilled n the art of programming to develop the code for operational software. The software design is broken into two major parts, and these parts are the communications software and the database software. The routines correspond to those described with reference to FIGS. 6 and 7.

The GETS host communications software receives calls from the concentrators 17 and calls all of the concentrators 17. Data received from the 17 is stored into a large buffer and a queue contains the location of the buffer. After all of the data has been received, the data is reformatted for a database update routine. The reformatted data is again stored in a large buffer and a queue is used to keep track of the buffer.

GETS main routine - When the main routine first starts, it initializes the communications port, starts the Paradox engine, and calls all the concentrators 17 identified in the database 12a. The GETS software then starts looking of any incoming data from a concentrator, or checks to see if it is time to call the concentrators 17. Once one of these events occurs, the main routine calls the appropriate subroutine or function, and keeps on checking for one of the events to occur. The GETS main routine PDL is as follows:

```
BEGIN GETS_MAIN;
    Initialize Communication Port;
    Initialize Database Software;
    Call all of the Concentrators;
    LOOP
        Is it time to call Concentrators Then
            Call all of the Concentrators;
        Is there data to be read in Then;
            Get the Data;
    END LOOP
```

GETS Call concentrators routine - The call concentrators routine reads the table sequentially until it reaches the end of the table. Each of the concentrators 17 called has its database entry updated to reflect the current status. If a does not respond, it is identified as having a NO RESPONSE status, and is noted in the activity log.

```
BEGIN RECEIVE DATA
    IF Data is from a THEN
        ALLOCATE Buffer;
        READ data into Buffer;
        CHECK the checksum;
    END IF;
END RECEIVE DATA;
```

GETS process input data software routine - The process input data routine takes the raw data received by the receive data routine and converts the data into a format that a database update routine can use. It allocates a new buffer for the database update routine and frees the buffer allocated in the receive data routine. The new buffer address is inserted on a queue and the database update routine is called. Should the process input data routine find an error, it returns a boolean FALSE, otherwise it returns a boolean TRUE.

```
GETS process input data PDL
BEGIN PROCESS INPUT DATA
   LOOP
      ALLOCATE buffer;
      Convert data;
      WHILE (not at last collector)
         Convert collector data;
         WHILE (not last sensor)
            Convert sensor data;
         END WHILE;
      END WHILE
      IF end of data stream THEN
         BREAK;
      END IF;
   END LOOP;
   CALL Update Database;
END PROCESS INPUT DATA;
```

GETS database software - Updating of the GETS database 12a is done by the GETS host software and by the end user. The GETS host software function without any of the end user supplied data; however, very little information about the equipment location can be obtained without the user data.

One type of information that the end user needs to enter is the GETS sensor ID number. The sensor ID number holds the key to linking the GETS database 12a to

```
GETS call concentrators PDL
BEGIN CALL CONCENTRATORS
   DO UNTIL No more concentrators
      GET concentrator
      Call the concentrator
   END DO
```

GETS get data routine - The get data routine performs most of the communications handshaking with the concentrator 17. It calls a routine to allocate buffer space and to read the data into the buffer. When the data has been successfully read in, the get data routine sends an acknowledgment back to the concentrator 17. If the concentrator 17 needs the host computer phone number, this routine sends it to the concentrator 17. The GETS get concentrator data PDL is as follows:

```
BEGIN GET CONCENTRATOR DATA
   LOOP
      Send Data Request;
      Receive Data;
      IF error THEN
         Set HARDWARE ERROR;
         BREAK;
      END IF;
      IF Send Phone Number Request THEN
         Send Phone Number;
         NEXT;
      END IF;
      IF No more Data THEN
         Send acknowledgment;
         BREAK;
      END IF;
   END LOOP
   Process the Data;
   RETURN;
```

```
-continued
END;
```

GETS receive data routine - This software routine checks to make sure that only a concentrator 17 has called, and receives all of the concentrator 17 data. It allocates a buffer to receive the data and puts the buffer address on the queue for a process input data software routine. The GETS receive data PDL is as follows: other databases, and for the tracking of all the equipment 31-34. GETS host software access the sensor ID number through the sensor table. The sensor table is flexible enough that any additional information can be added to this database, as long as the SENSOR ID field and the two fields following the SENSOR ID number are not modified.

Other databases that the end user supplies input are the CONCENTR table, COLINFO table, and the COLLECT table. The only fields that the user should not modify in these tables are the status field and the sensor field. These fields are updated by the GETS host software. The CONCENTR table contains information about each concentrator 17 in the GETS system 10. The user must provide the concentrator address, building location, room number, and the phone number of the modem. COLINFO table contains information about each collector 19 that is in the GETS system 10. This information includes the and concentrator trunk number that the collector 19 is attached to, and the building and room number where the collector 19 is located. The building and room number in this case are not used to tack any equipment 31-34 except for the collector 19 itself. The other main table in the GETS system 10 is the COLLECT table. It contains information about where each sensor 18 is located. User provided fields are: Address; Trunk number of the concentrator 17; Collector address; Port number of the collector 19; Building; and Room number. This allows the user to assign each port on the collector to a unique location.

Software is provided to allow the end user to update the required tables, and fields in the tables. This software allows the updating of the tables to be very easy, through the uses of menus and data entry screens. GETS host software updates all of the tables, except for the sensor table. Only the fields that are not updated by the end user are updated by the software. The only exception is if a user forgot to enter data into one of the fields, such as the collector ID, or concentrator ID. In this case, the GETS host software writes the particular ID into the tables, and leaves the other fields blank.

GETS data entry screen - A GETS data entry screen is used to enter each sensor ID number into the sensor table. A representative data entry screen is shown below. Any additional fields that are needed, in order to keep track of equipment 31-34 or for other database links, are added or updated by this data entry screen. The end user only has access to the fields located on this screen. Only the sensor ID number and either the equipment tag or contractor tag are required fields. The sensor ID number has a range of 1 to 67,108,864 and the other fields can contain any alphanumeric value.

| DATA ENTRY SCREEN | | |
|---|---|---|
| GETS ID | EQUIPMENT TAG | CONTRACTOR TAG |
| ------- | ----------------------- | ------------------------- |
| ------- | ----------------------- | ------------------------- |

| DATA ENTRY SCREEN | | |
|---|---|---|
| GETS ID | EQUIPMENT TAG | CONTRACTOR TAG |
| ------- | ---------------- | ---------------- |
| ------- | ---------------- | ---------------- |
| ------- | ---------------- | ---------------- |
| ------- | ---------------- | ---------------- |
| ------- | ---------------- | ---------------- |
| ------- | ---------------- | ---------------- |
| ------- | ---------------- | ---------------- |
| ------- | ---------------- | ---------------- |

GETS collector data entry screen-Shown below is a representative collector data entry screen, used for adding and updating the collector table information. For this data entry screen the end user needs to enter the ID, trunk number, building number, and room number for each port 23. These are important fields, since without these fields, one would not be able to locate the equipment. The data entry software asks for the concentrator ID and trunk 22 that the collector 19 is connected to. Then the software routine asks for the model of the collector 19. Upon receiving this information the software assigns a collector ID and builds entries for each possible port 23 on the collector 19, and displays this information. The user is then required to enter in the building and room numbers.

| COLLECTOR DATA ENTRY SCREEN | | | |
|---|---|---|---|
| Concentrator ID: _____ | | Trunk Number: __ | Collector ID: ___ |
| Port: __ | Port: __ | Port: __ | Port: __ |
| Building: _____ | Building: _____ | Building: _____ | Building: _____ |
| Room: _____ | Room: _____ | Room: _____ | Room: _____ |

GETS data entry screen-The maintenance screen, allows the user to assign a phone number, building number, and a room number to a concentrator 17. A representative maintenance screen is shown below. The address is generated by this software, and it is the next available number for a concentrator 17. The address starts at one and go up to an eight digit number. All of the fields that the user enters are alphanumeric and any character can be entered into these fields except for the phone number. The phone number must be numeric. The data entry software automatically formats the phone number for the user. All of fields on this screen are required to have data, and if any field is left blank the record will not be added to the database 12a.

| CONCENTRATOR MAINTENANCE SCREEN |
|---|
| Address: _____ |
| Phone Number: _____ |
| Building Number: _____ |
| Room Number: _____ |

GETS update database routine-The update database routine takes the formatted data from the process routine, updates the database tables and displays system status messages on the display. After all of the data in a buffer is processed, it is then freed.

```
GETS update database PDL
BEGIN UPDATE_DATABASE
  OPEN databases
  WHILE queue not empty
    GET buffer;
    DISPLAY concentrator status;
    UPDATE concentrator database
    WHILE not last collector;
      DISPLAY collector status;
      UPDATE collector database;
      WHILE not last sensor;
        DISPLAY sensor status;
        UPDATE sensor information;
      END WHILE;
    END WHILE;
    FREE buffer;
  END WHILE;
END UPDATE_DATABASE;
```

GETS get concentrator routine-The concentrator routine is comprised of several functions, which are: Open_Concentrator; First_Concentrator_Rec; Next_Concentrator_Rec; Update_Concentrator_DB; Get_Concentrator; and Close_Concentrator. Open_concentrator opens the database table and assigns field name to variables. If any errors are found a boolean FALSE is returned, otherwise a boolean TRUE is returned. The First_Concentrator_Rec function sets the database record pointer to the first record in the table. Next_Concentrator_Rec works in conjunction with the First_Concentrator_Rec. It gets the current table record pointed to by the database record pointer, and it points to the next record. This software routine returns a boolean TRUE, unless an error is found or if the last record in the table has been gotten. The Update_Concentrator_DB function takes the data passed to it in the calling arguments and updates the table. A boolean TRUE is returned, unless an error occurred. This is the only function that writes to the table. The get_concentrator routine searches the table for the record specified in the calling arguments. Once the record is located is passes back all fields of the table. If the record could not be found, then a boolean FALSE is return, otherwise a boolean TRUE is returned.

GETS write activity log routine-The write activity log routine takes as a input argument a GETS_LOG_TYPE record. This routine takes the record adds a time stamp and writes the record to the LOG table. The three routine that make up the write log routine are: Open_Write_Activity_Log; Write_Activity_Log; and Close_Activity_Log GETS update collector table routine-The collector table routine is the main table of the GETS system. It contains all of the sensors and the location of all of the sensors. There are four procedures that make up the update collector table routine. These procedures are: Open_Collector_DB; Get_Collector; Put_Collector; and Close_Collector. The two procedures Open_Collector_DB and Close_Collector perform the opening and closing of the database table. Open_Collector_DB is a function that returns a boolean TRUE if it was successful. The Close_Collector is a subroutine and does not return any value. Get_Collector is a function that searches the collector table for the table record specified in the structure, passed as an argument. When the record is found, the table record is moved into the record structure, and a boolean TRUE is passed back to the caller. Put_Collector takes the information in the structure, passed as an argument, and writes the information into the collector table. If the record does not exist in the table it is added to the table, otherwise the information is inserted into the table as a new record. This procedure is a subroutine and has no return value.

GETS update collector information table routine-Information about the collector 19 is keep in the collector information table. It contains such data as the building and room number where the collector 19 is located. The current hardware status of the collector is stored in this table. This update routine is comprised of the following software routines: Open_Collector_Info; Get_Collector_Info; Update_Collector_Info; and Close_Collector_Info. The two routines Open_Collector_Info and Close_Collector_Info perform the opening and closing of the COLINFO table. Only the routine Open_Collector_Info is a function that returns a boolean TRUE or FALSE, depending upon the success of the function. Both Get_Collector_Info and Update_Collector_Info take the structure Collector_Info_Record_Type as calling arguments. In the case of Get_Collector_Info it takes the information from the structure and searches for the table record. When the record is found, it moves the data in the record to the structure and boolean TRUE is returned. Update_Collector_Info takes the data from the structure and updates the table with the data.

GETS update disconnect table routine-The update disconnect table routine opens, adds, finds and deletes records from the disconnect table. This table is used by the update database routine to keep track of all sensors 18 that have been disconnected from the system 10. Sensors 18 are added to the table when the system 10 sees a disconnection, and removes the sensor 18 from the table when the system 10 sees a reconnection. The disconnect table software is comprised of the following routines: Open_Disconnect_Table; Add_To_Disconnect_Table; Find_In_Disconnect_Table; Remove_From_Disconnect_Table; and Close_Disconnect_Table. Opening and closing of this table is handled by the Open_Disconnect_Table and Close_Disconnect_Table. The Add_To_Disconnect_Table routine adds new sensors to the table, when they are disconnect from the GETS system 10. Along with the sensor ID number, the building, room number, concentrator ID number, concentrator trunk, collector ID, and collector port ID number are stored here in this table. This information is used when the sensor 18 is reconnected. All of this information is stored in a C structure, which is passed as an argument to the software routine. Find_In_Disconnect_Table is used to search the table for a sensor 18. When the sensor 18 is found a boolean TRUE is returned and the sensor 18, along with the other information is passed back through a C structure. Remove_From_Disconnect_Table software routine removes the sensor 18 from the table, when the sensor 18 is reconnected. The sensor ID number is passed to the routine by a C structure.

GETS update sensor table routine-The main purpose of the sensor table is to associate the sensor ID number to an external database 13. By adding other fields to the table one could use this table to store such items as: Equipment description; Vendor name; and Serial numbers. GETS host software only uses this table to provide information in the messages that it displays. No writing is done by the GETS host software, except in the case where a sensor ID number could not be found. The routines that make up the sensor database table software are: Open_Sensor_DB; Get_Sensor; Put_Sensor; and Close_Sensor_DB. Open_Sensor_DB and Close_Sensor_DB are use by the GETS host software to open and close the sensor database table. Get_Sensor is used to fetch information about a sensor from the sensor database table. The information is passed to the caller by using a C structure. If the sensor 18 can not be found, the routine returns a boolean FALSE, otherwise the routine returns a boolean TRUE. When a sensor 18 can not be found, the GETS host software calls Put_Sensor, to add the sensor 18. All information about the sensor 18, except for the sensor ID number, is blanked out. This procedure is done if the user did not add the sensor 18.

What is claimed is:

1. An equipment tracking system for providing configuration management control over a plurality of pieces of equipment, said system comprising:

a plurality of sensors individually coupled to individual ones of the pieces of equipment, and wherein each sensor has a unique ID code associated therewith;

a plurality of collectors, wherein each collector is coupled to selected sensors, for communicating with each of the sensors, and for reading out the ID code of each of the sensors at selected times, and for storing sensor changes for those sensors that have changed since a prior reading;

a concentrator coupled to each collector of the plurality of collectors, for communicating with the plurality of collectors, and for causing the collectors to transmit the sensor changes thereto;

a communication link;

a computer having a database coupled thereto, which computer is coupled to the concentrator by means of the communication link, and wherein the computer comprises means for causing the concentrator to transmit the stored sensor changes to the computer for storage in the database.

2. The system of Claim 1 wherein each of the sensors comprise:

a plurality of shift registers respectively coupled through a plurality of electrical paths comprising a plurality of resistors coupled to ground, and wherein the electrical paths are selectively opened and closed to provide the ID code of the sensor; and an communication interface coupled to the plurality of shift registers for receiving signals from the collector that cause the sensor to read out the ID code, and for transmitting the ID code to the collector.

3. The system of Claim 1 wherein each of the collectors comprise:

communication interface means coupled to the communication interfaces of the sensors for transmitting the signals to the sensor that cause the sensor to read out the sensor's ID code and for receiving the transmitted ID codes;

storage memory means coupled to the communication interface means for storing the ID codes received from each of the sensors;

program memory means coupled to the storage memory means for reading out the ID codes therefrom;

microprocessor means coupled to the storage memory means and the program memory means, for causing the transmission of the signals to the sensors that cause them to read out their ID codes, and for storing the ID codes in the storage memory means; and transceiver means coupled to the microprocessor means for transmitting sensor changes to the concentrator under control of the microprocessor means.

4. The system of Claim 1 wherein the concentrator comprises:

transceiver means coupled to the transceiver means of the collectors for transmitting the signals to the sensor that cause the sensor to read out its ID code and for receiving the transmitted ID codes;

storage memory means coupled to the communication interface means for storing the ID codes received from each of the sensors through the collectors;

program memory means coupled to the storage memory means for reading out the ID code changes therefrom;

microprocessor means coupled to the storage memory means and the program memory means, for causing the transmission of the selected signals to the collector that cause the sensors to read out their ID codes, and for storing the ID codes in the storage memory means; and universal asynchronous receiver/transmitter means coupled to the microprocessor means for transmitting the sensor changes through the collectors to the concentrator under control of the microprocessor means.

5. The system of Claim 2 wherein each of the collectors comprise:

communication interface means coupled to the communication interfaces of the sensors for transmitting the signals to the sensor that cause it to read out its ID code and for receiving the transmitted ID codes;

storage memory means coupled to the communication interface means for storing the ID codes received from each of the sensors;

program memory means coupled to the storage memory means for reading out the ID codes therefrom;

microprocessor means coupled to the storage memory means and the program memory means, for causing the transmission of the signals to the sensors that cause them to read out their ID codes, and for storing the ID codes in the storage memory means; and transceiver means coupled to the microprocessor means for transmitting sensor changes to the concentrator under control of the microprocessor means.

6. The system of Claim 3 wherein the concentrator comprises:

transceiver means coupled to the transceiver means of the sensors for transmitting the signals to the sensor that cause it to read out its ID code and for receiving the transmitted ID codes;

storage memory means coupled to the communication interface means for storing the ID codes received from each of the sensors;

program memory means coupled to the storage memory means for reading out the ID codes therefrom;

microprocessor means coupled to the storage memory means and the program memory means, for causing the transmission of the signals to the sensors that cause them to read out their ID codes, and for storing the ID codes in the storage memory means; and universal asynchronous receiver/transmitter means coupled to the microprocessor means for transmitting sensor changes to the concentrator under control of the microprocessor means.

7. An equipment tracking system for providing configuration management control over a large number of pieces of equipment, said system comprising:

a plurality of sets of sensors, wherein individual ones of the sensors in each set are coupled to individual ones of the pieces of equipment, and wherein each sensor has a unique ID code associated therewith;

a plurality of collectors, wherein each collector is coupled to a selected set of sensors, for communicating with each of the sensors in the set of sensors, and for reading out the ID code of each of the sensors at selected times, and for storing sensor changes for the plurality of collectors for those sensors that have changed since a prior reading;

a concentrator coupled to each collector in the plurality of collectors, for communicating with the plurality of collectors, and for causing the collectors to transmit the sensor changes thereto;

a communication link;

a computer having a database coupled thereto, which computer is coupled to the concentrator by means of the communication link, and wherein the computer comprises means for causing the concentrator to transmit the stored sensor changes to the computer for storage in the database.

8. The system of Claim 7 wherein each of the sensors comprise:

a plurality of shift registers respectively coupled through a plurality of electrical paths comprising a plurality of resistors coupled to ground, and wherein the electrical paths are selectively opened and closed to provide the ID code of the sensor; and an communication interface coupled to the plurality of shift registers for receiving signals from the collector that cause the sensor to read out the ID code, and for transmitting the ID code to the collector.

9. The system of Claim 7 wherein each of the collectors comprise:

communication interface means coupled to the communication interfaces of the sensors for transmitting the signals to the sensor that cause it to read out its ID code and for receiving the transmitted ID codes;

storage memory means coupled to the communication interface means for storing the ID codes received from each of the sensors;

program memory means coupled to the storage memory means for reading out the ID codes therefrom;

microprocessor means coupled to the storage memory means and the program memory means, for causing the transmission of the signals to the sensors that cause them to read out their ID codes, and for storing the ID codes in the storage memory means; and transceiver means coupled to the microprocessor means for transmitting sensor changes to the concentrator under control of the microprocessor means.

10. The system of Claim 7 wherein the concentrator comprises:
- transceiver means coupled to the transceiver means of the sensors for transmitting the signals to the sensor that cause it to read out its ID code and for receiving the transmitted ID codes;
- storage memory means coupled to the communication interface means for storing the ID codes received from each of the sensors;
- program memory means coupled to the storage memory means for reading out the ID codes therefrom;
- microprocessor means coupled to the storage memory means and the program memory means, for causing the transmission of the signals to the sensors that cause them to read out their ID codes, and for storing the ID codes in the storage memory means; and
- universal asynchronous receiver/transmitter means coupled to the microprocessor means for transmitting sensor changes to the concentrator under control of the microprocessor means.

11. The system of Claim 8 wherein each of the collectors comprise:
- communication interface means coupled to the communication interfaces of the sensors for transmitting the signals to the sensor that cause it to read out its ID code and for receiving the transmitted ID codes;
- storage memory means coupled to the communication interface means for storing the ID codes received from each of the sensors;
- program memory means coupled to the storage memory means for reading out the ID codes therefrom;
- microprocessor means coupled to the storage memory means and the program memory means, for causing the transmission of the signals to the sensors that cause them to read out their ID codes, and for storing the ID codes in the storage memory means; and
- transceiver means coupled to the microprocessor means for transmitting sensor changes to the concentrator under control of the microprocessor means.

12. The system of Claim 11 wherein the concentrator comprises:
- transceiver means coupled to the transceiver means of the sensors for transmitting the signals to the sensor that cause it to read out its ID code and for receiving the transmitted ID codes;
- storage memory means coupled to the communication interface means for storing the ID codes received from each of the sensors;
- program memory means coupled to the storage memory means for reading out the ID codes therefrom;
- microprocessor means coupled to the storage memory means and the program memory means, for causing the transmission of the signals to the sensors that cause them to read out their ID codes, and for storing the ID codes in the storage memory means; and
- universal asynchronous receiver/transmitter means coupled to the microprocessor means for transmitting sensor changes to the concentrator under control of the microprocessor means.

* * * * *